Nov. 26, 1963

N. A. BORGLIN ETAL 3,112,237

TIRE BUILDING MACHINES

Filed March 6, 1961

INVENTORS
NILS A. BORGLIN and ANDERS M. E. APPELGREN

By Winderoth, Lind & Ponack

ATTORNEYS

Nov. 26, 1963   N. A. BORGLIN ETAL   3,112,237
TIRE BUILDING MACHINES

Filed March 6, 1961                             2 Sheets-Sheet 2

INVENTORS
NILS A. BORGLIN and ANDERS M. E. APPELGREN
BY
ATTORNEYS

United States Patent Office
3,112,237
Patented Nov. 26, 1963

3,112,237
TIRE BUILDING MACHINES
Nils Axel Borglin and Anders Mats Erik Appelgren, Trelleborg, Sweden, assignors to Trelleborgs Gummifabriks Aktiebolag, Trelleborg, Sweden, a corporation of Sweden
Filed Mar. 6, 1961, Ser. No. 93,728
Claims priority, application Sweden Mar. 9, 1960
3 Claims. (Cl. 156—403)

This invention relates to a tire building machine.

Tire building machines of the type comprising an expansible tire building drum having in its circumference two grooves for receiving two prefabricated bead wire rings or so-called bead cores, and having two tire ply fabric turnover means provided one at each end of the tire building drum, are known in the art. In these machines there are employed two bead core placing and positioning means each secured to a movable rod to place the bead cores in the grooves of the tire building drum during the building of a tire on said drum. It has proved necessary in the previously known machines of the type in question to use relatively complicated mechanisms for operating the bead core placing and positioning means, as these have to effect movements in different directions in order not to hamper the removal from the machine of a finished tire built on the tire building drum thereof.

The present invention has for its object to eliminate the above-mentioned drawback and thus relates to a tire building machine of the type mentioned in the foregoing, which is characterised in that the rods of the bead core placing and positioning means are movably mounted on a frame on which there is also mounted a shaft carrying the tire building drum and the tire ply fabric turnover means freely extending in cantilever fashion from one side of said frame, one rod—the drive rod—being connected to a drive for shifting said rod between a position in which the "inner" bead core placing and positioning means carried by the operating rod is opposite the groove of the tire building drum nearest the frame, and a position in which the inner bead core placing and positioning means is at the end, remote from the frame, of the "outer" fabric turnover means which is farthest away from the frame, said drive rod being equipped with dogs which are adapted, during the shifting of the rod to engage the "outer" bead core placing and positioning means carried by the other rod and to move it between a position opposite the groove of the tire building drum farthest away from the frame and a position at the end, remote from the frame, of the outer fabric turnover means.

In the tire building machine according to the invention there is thus required but a single drive for the two bead core placing and positioning means which have only to effect a rectilinear shifting movement, and said means still permit removal of a finished tire from the tire building drum.

For a better understanding the invention will be described more in detail in the following, reference being made to the accompanying drawings which diagrammatically show an example of the tire building machine. In the drawings.

Figure 1:
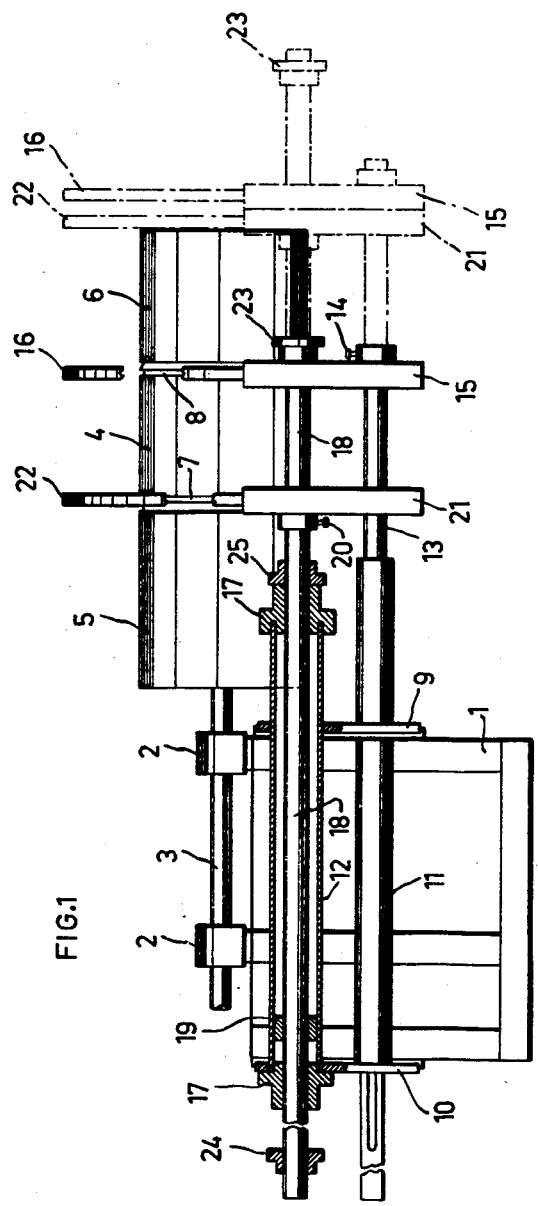
FIG. 1 shows a side elevational view, partly in section, of a tire building machine improved in accordance with the invention.

A shaft 3 is mounted for rotation in bearings 2 on a frame 1 which is composed of beams, and one end of said shaft extends from one side of the frame and carries a drum assembly consisting of a tire building drum 4 and two fabric turnover drums 5 and 6 one arranged at each end of the tire building drum. The drums 4–6 are expansible, and their circumferential surfaces may be formed by axially extending segments although this has not been shown in the drawings, for greater clarity thereof. The drum assembly 4–6 and its operating mechanism may be designed for instance in the manner described in Ser. Nos. 84,030 and 84,039, both now abandoned. Adjacent each end the tire building drum 4 has grooves 7 and 8, respectively, in its circumference.

When a tire is to be built on the drum asesmbly 4–6 a strip of cord fabric is first wrapped one or more turns around the non-expanded drum assembly. The strip of cord fabric (not shown) is of such a width and is mounted in such a way as to fully cover the tire building drum 4 and to partly reach inwards over each fabric turnover drum 5, 6. Then two prefabricated bead cores (not shown) are passed over the free end of the drum assembly 4–6 and positioned opposite the grooves 7 and 8 of the tire building drum 4, whereafter the drum assembly is expanded so that the bead cores are caused to lie in the grooves 7, 8 with the strip of cord fabric between them and the tire building drum 4. Now the fabric turnover drum 5, that is the turnover drum closest to the frame 1 or "inner" turnover drum, is first moved inwards over the tire building drum 4, whereby one marginal portion of the strip of cord fabric is turned over the bead core positioned in the "inner" groove 7 of the tire building drum 4, and is glued to the part of the strip of cord fabric between the bead cores. The inner fabric turnover drum 5 is then returned to the FIG. 1 position at the same time as the other "outer" fabric turn-over drum 6 is moved inwards over the tire building drum 4 so that the other marginal portion of the strip of cord fabric is turned over the bead core situated in the "outer" groove of the tire building drum 4 and is glued to the part of the strip of cord fabric between the bead cores. The outer fabric turnover drum 6 is returned to the initial position shown in FIG. 1, and then the tread and other rubber portions of the tire are applied. Finally, the drum assembly 4–6 is collapsed to its smallest diameter so that the finished tire can be removed from the drum assembly over the free end thereof which faces away from the frame 1. For the details of the structural measures that must be taken in this tire building method in respect of the drum assembly 4–6 reference is made to the aforementioned patents, as these structural details do not constitute any part of the present invention.

Figure 2:
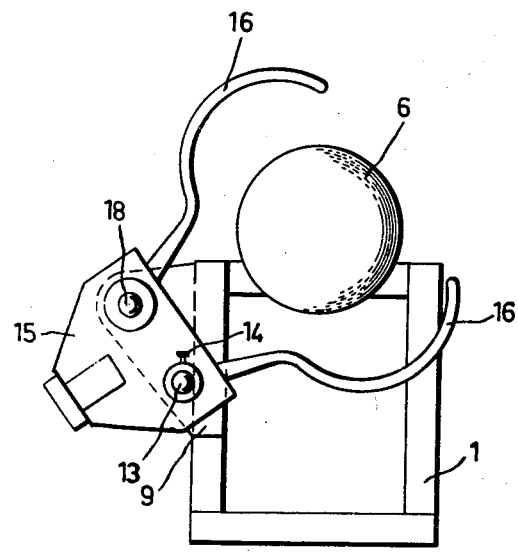
FIG. 2 shows the machine as seen from the right in FIG. 1.

For supplying and mounting the bead cores use is made of the following mechanism. Secured to two corner posts of the frame 1 are two mounting plates 9 and 10 in which are fixed a mounting sleeve 11 and a pressure medium cylinder 12 the longitudinal axes of which are parallel with the axis 3 of the drum assembly 4–6. A rod 13 is slidably and non-rotatably mounted in the sleeve 11, and on one end of said rod which extends from the sleeve 11 there is secured the head 15 of an "outer" bead core placing and positioning means with the aid of a setscrew 14. Holder arms 16 of a previously known type extend from the head 15. Said arms 16 have curved outer ends and are pivotally mounted in the head 15 so as to permit them to be swung from the FIG. 2 release position to a position in which they are moved closer together and in which they clamp between them a bead core, holding it coaxial with the drum assembly 4–6. A drive rod 18 is slidably and non-rotatably mounted in the end cover 17 of the cylinder 12. In the interior of the cylinder 12 a piston 19 is secured to the drive rod 18 so that said rod can be moved along the cylinder by pressure medium supplied in a manner not shown in detail alternately at one and the other end of the cylinder. Secured with the aid of a setscrew 20 to the portion of the drive rod 18 located beside the drum assembly 4–6 and extending from the cylinder 12, at some distance from the end of said portion, is the head 21 of an "inner" bead core placing and positioning means which is of the same design as the outer bead core placing and positioning means 15, 16 and provided with holder arms 22. The head 21 is movable on the rod 13 and the head 15 is movable on the drive rod 18. An abutment element in the form of a stop ring 23 is adjustably fixed to the end of the drive rod 18 extending from the head 15. A stop ring 24 is adjustably fixed to the other end of the drive rod 18 which also extends from the cylinder 12. Finally, a stop ring 25 is adjustably fixed to the drive rod 18 between the head 21 of the placing and positioning means and the adjacent cylinder cover 17.

At the start of a tire building operation the bead core placing and positioning means 15, 16 and 21, 22 are situated closely adjacent to one another at the end of the outer fabric turnover drum 6 facing away from the frame 1, as is indicated by dash and dot lines in FIG. 1. Prefabricated bead cores are clamped between the arms 16 and the arms 22, respectively, while the bead core placing and positioning means occupy this position. After the strip of cord fabric has been wrapped around the tire building drum 4 in the manner already described, pressure medium is supplied to the right end of the cylinder 12 (see FIG. 1) so that the piston 19 causes the drive rod 18 to move to the left as seen in FIG. 1. At the beginning of this movement of the drive rod 18 first only the head 21 of the placing and positioning means secured to the drive rod 18 is moved together with said drive rod. However, when said head 21 has been moved sufficiently far away from the head 15 of the placing and positioning means that the bead cores clamped by said two placing and positioning means are at a relative distance equal to that between the grooves 7 and 8 of the tire building drum 4, the abutment ring 23 engages the head 15 and carries this head, too, along in the movement of the drive rod 18. As the head 15 is secured to the rod 13 this rod will likewise be moved to the left as seen in FIG. 1. The common movement of the rods 13, 18 and heads 15, 21 continues until the abutment ring 25 engages one end cover 17 of the cylinder 12. This will stop the heads 15, 21 in the positions shown in FIG. 1, in which the bead cores clamped by the holder arms 16, 22 are opposite the grooves 7, 8 of the tire building drum. When the tire building drum 4 is expanded in the aforementioned manner the holder arms 16, 22 are swung apart, for example, by hand, leaving the bead cores in the grooves 7, 8. After the arms 16, 22 have been swung apart to the FIG. 2 position pressure medium is admitted to the left end of the cylinder 12 (see FIG. 1) so that the piston 19 moves the drive rod 18 to the right. Being secured to the drive rod 18, the bead core placing and positioning means 21, 22 takes part in this movement of the drive rod 18 from the very beginning, whereas the bead core placing and positioning means 15, 16 to begin with remains in its FIG. 1 position, while the abutment ring 23 leaves the head 15. During the continued movement the head 21 will engage the head 15 so that the latter is carried along in the movement of the rod 18 and head 21 to the right as seen in FIG. 1. The rod 13 to which the head 15 is secured, is also carried along in this movement. The movement is stopped when the ring 24 engages one end cover 17 of the cylinder 12. When the movement has ceased the bead core placing and positioning means 15, 16 and 21, 22 occupy the position shown by dash and dot lines in FIG. 1, in which the bead core placing and positioning means are located at the end of the outer fabric turnover drum 6 which is farthest away from the frame. When the bead core placing and positioning means occupy this position with the arms 16, 22 swung apart (FIG. 2) they do not in any way hamper the removal of the tire built on the drum assembly 4–6, and new bead cores are likewise easily placed between the arm 16, 22.

By fixing the heads 15, 21 and rings 23–25 in suitable positions on the rods 13, 18 the positions of the bead core placing and positioning means and the distances they and the rods 13, 18 have to be moved are easily adapted to each other.

The above embodiment of the invention was described for purpose of illustration rather than limitation. All variations and modifications of the invention are understood as being included within the scope of the appended claims.

What we claim is:

1. A bead ring positioning apparatus for tire building machines with a tire building drum structure having one free end and journaled in a frame at the other end, said bead ring positioning apparatus comprising an outer bead ring gripping means and an inner bead ring gripping means positioned side by side along the axis of the tire building drum structure with said inner gripping means adapted to be closer to the machine frame than said outer gripping means, a drive rod mounted for reciprocation in its longitudinal direction and adapted to extend along the drum structure, said inner gripping means being fastened to said drive rod to participate in the reciprocation thereof, drive means adapted to be mounted on the machine frame and to which said drive rod is connected for reciprocating said drive rod between two end positions in one of which said inner gripping means is located at the free end of the drum structure and in the other of which said inner gripping means is located in register with a first predetermined portion of the drum structure, a guide rod adapted to be mounted in the frame for sliding motion in its longitudinal direction and extending in parallel with said drive rod, said outer gripping means being fastened to said guide rod, said outer gripping means being abuttable by said inner gripping means and movable thereby to a position at the free end of the drum structure adjacent said inner gripping means, and abutment means on said drive rod for engaging and moving said outer gripping means back to a position in register with a second predetermined portion of the drum structure which is spaced from the first predetermined portion of the drum structure when said drive rod is moved from a position in which said inner gripping means is in the said other end position at the free end of the drum structure and the said one end position in register with the first predetermined portion of the drum structure.

2. A bead ring positioning apparatus for tire building machines with a tire building drum structure having one free end and journaled in a frame at the other end, said bead ring positioning apparatus comprising an outer bead ring gripping means and an inner bead ring gripping means positioned side by side along the axis of the tire building drum structure with said inner gripping means adapted to be closer to the machine frame than said outer gripping means, a drive rod mounted for reciprocation in its longitudinal direction and adapted to extend along the drum structure, releasable locking means adjustably fastening said inner gripping means to said drive rod so that said inner gripping means participates in the reciprocation of said drive rod, drive means adapted to be mounted on the machine frame and to which said drive rod is connected for reciprocating said drive rod between two end positions in one of which said inner gripping means is located at the free end of the drum structure and in the other of which said inner gripping means is located in register with a first predetermined portion of the drum structure, a guide rod adapted to be mounted in the frame for sliding motion in its longitudinal direction and extending in parallel with said drive rod, releasable fastening means adjustably locking said outer gripping means to said guide rod, said outer gripping means being abuttable by said inner gripping means and movable thereby to a position at the free end of the drum structure adjacent said inner gripping means, and abutment means on said drive rod for engaging and moving said outer gripping means back to a position in register with a second predetermined portion of the drum structure which is spaced from the first predetermined portion of the drum structure when said drive rod is moved from a position in which said inner gripping means is in the said other end position at the free end of the drum structure and the said one end position in register with the first predetermined portion of the drum structure.

3. A bead ring positioning apparatus for tire building machines with a tire building drum structure having one free end and journaled in a frame at the other end, said bead ring positioning apparatus comprising an outer bead ring gripping means and an inner bead ring gripping means positioned side by side along the axis of the tire building drum structure with said inner gripping means adapted to be closer to the machine frame than said outer gripping means, a drive rod mounted for reciprocation in its longitudinal direction and adapted to extend along the drum structure, said inner gripping means being fastened to said drive rod at a point spaced from the end thereof to participate in the reciprocation thereof, drive means adapted to be mounted on the machine frame and to which said drive rod is connected for reciprocating said drive rod between two end positions in one of which said inner gripping means is located at the free end of the drum structure and in the other of which said inner gripping means is located in register with a first predetermined portion of the drum structure, a guide rod adapted to be mounted in the frame for sliding motion in its longitudinal direction and extending parallel to said drive rod, said guide rod having said outer gripping means fastened to the end thereof and said drive rod extending through said outer gripping means in slidable relationship thereto, said outer gripping means being abuttable by said inner gripping means and movable thereby to a position at the free end of the drum structure adjacent said inner gripping means, and an abutment on the end of said drive rod for engaging and moving said outer gripping means back to a position in register with a second predetermined portion of the drum structure which is spaced from the first predetermined portion of the drum structure when said drive rod is moved from a position in which said inner gripping means is in the said other end position at the free end of the drum structure and the said one end position in register with the first predetermined portion of the drum structure.

References Cited in the file of this patent

UNITED STATES PATENTS

| | | |
|---|---|---|
| 1,662,004 | Jenkinson | Mar. 6, 1928 |
| 1,921,579 | Otto | Aug. 8, 1933 |
| 2,790,481 | Beckadolph | Apr. 30, 1957 |
| 2,838,091 | Kraft | June 10, 1958 |

FOREIGN PATENTS

| | | |
|---|---|---|
| 331,073 | Great Britain | June 26, 1930 |